United States Patent
Do

(10) Patent No.: US 10,240,389 B2
(45) Date of Patent: Mar. 26, 2019

(54) PRESSURE RELIEF DOOR

(71) Applicant: Arconic Inc., Pittsburgh, PA (US)

(72) Inventor: Thai Do, Laguna Niguel, CA (US)

(73) Assignee: Arconic Inc., Pittsburgh, PA (US)

( * ) Notice: Subject to any disclaimer, the term of this patent is extended or adjusted under 35 U.S.C. 154(b) by 294 days.

(21) Appl. No.: 15/278,370

(22) Filed: Sep. 28, 2016

(65) Prior Publication Data

US 2017/0089124 A1 Mar. 30, 2017

Related U.S. Application Data

(60) Provisional application No. 62/234,759, filed on Sep. 30, 2015.

(51) Int. Cl.
*B64C 1/14* (2006.01)
*E06B 5/12* (2006.01)
(Continued)

(52) U.S. Cl.
CPC .............. *E06B 5/12* (2013.01); *B64C 1/1461* (2013.01); *E05C 19/02* (2013.01);
(Continued)

(58) Field of Classification Search
CPC ..... E06B 5/12; B64C 1/1461; E05D 11/1007; E05C 19/02; E05Y 2900/252; E05Y 2800/252
(Continued)

(56) References Cited

U.S. PATENT DOCUMENTS 1,206,342 A 11/1916 Linborg
2,712,955 A 7/1955 Andrews
(Continued)

FOREIGN PATENT DOCUMENTS

CN 203094456 U 7/2013
DE 202220 C 9/1908
(Continued)

OTHER PUBLICATIONS

Aerospace Latching Systems, Alcoa Fastening Systems, http://www.alcoa.com/fastening_systems/aerospace/en/product.asp?cat_id=213 &prod_id=500,pp. I1-I2, 159-160, and i-iii (8 pages).
(Continued)

*Primary Examiner* — Jerry E Redman
(74) *Attorney, Agent, or Firm* — Greenberg Traurig, LLP

(57) ABSTRACT

A pressure relief door having a panel with an exterior side and an interior side, a pair of pressure relief latches mounted to the interior side of the panel, and a pair of hinges mounted to the panel and each including a lock mechanism mounted thereto. Each of the lock mechanisms includes a mounting bracket. The door is adapted to be installed within a structure and moveable between a closed position, such that the exterior side of the panel is substantially flush with an exterior surface of the structure, the lock mechanisms are engaged with an interior surface of the structure, and the pressure relief latches are engaged with the interior surface of the structure, and an open position, such that the pressure relief latches are disengaged with the interior surface of the structure, while the lock mechanisms remain engaged with the interior surface of the structure.

16 Claims, 4 Drawing Sheets

(51) Int. Cl.
*E05C 19/02* (2006.01)
*E05D 11/10* (2006.01)
(52) U.S. Cl.
CPC ..... *E05D 11/1007* (2013.01); *E05Y 2800/252* (2013.01); *E05Y 2900/502* (2013.01)
(58) Field of Classification Search
USPC .......................................... 244/129.4, 129.5
See application file for complete search history.

(56) References Cited

U.S. PATENT DOCUMENTS

| | | | |
|---|---|---|---|
| 2,726,889 | A | 12/1955 | Lawson |
| 2,904,141 | A | 9/1959 | Henrichs |
| 2,927,812 | A | 3/1960 | Smith et al. |
| 2,944,848 | A | 7/1960 | Mandolf |
| 3,070,395 | A | 12/1962 | Morrison et al. |
| 3,259,411 | A | 7/1966 | Griffiths |
| 3,259,412 | A | 7/1966 | Wheeler |
| 3,341,239 | A | 9/1967 | Wheeler |
| 3,347,578 | A | 10/1967 | Sheehan et al. |
| 3,473,693 | A | 10/1969 | Fritz |
| 3,917,327 | A | 11/1975 | Plasko |
| 4,053,177 | A | 10/1977 | Stammreich et al. |
| 4,099,751 | A | 7/1978 | Poe et al. |
| 4,116,479 | A | 9/1978 | Poe |
| 4,130,307 | A | 12/1978 | Poe et al. |
| 4,183,564 | A | 1/1980 | Poe |
| 4,220,364 | A | 9/1980 | Poe |
| RE31,935 | E | 7/1985 | Poe |
| 4,530,529 | A | 7/1985 | Poe et al. |
| 4,538,843 | A | 9/1985 | Harris |
| 4,602,812 | A | 7/1986 | Bourne |
| 4,641,868 | A | 2/1987 | Miron |
| 4,826,221 | A | 5/1989 | Harmon |
| 4,828,299 | A | 5/1989 | Poe |
| 4,858,970 | A | 8/1989 | Tedesco et al. |
| 4,911,488 | A | 3/1990 | Brackmann et al. |
| 5,031,863 | A * | 7/1991 | Noble ............... B64C 1/1407 244/129.5 |
| 5,152,926 | A | 10/1992 | Brown |
| 5,228,730 | A | 7/1993 | Gokcebay et al. |
| 5,316,241 | A * | 5/1994 | Kallies ............... B64C 1/1407 16/243 |
| 5,341,752 | A | 8/1994 | Hambleton |
| 5,609,373 | A | 3/1997 | Gromotka |
| 5,620,212 | A | 4/1997 | Bourne et al. |
| 5,660,295 | A | 8/1997 | Hroma et al. |
| 5,664,813 | A | 9/1997 | Gromotka |
| 5,823,473 | A * | 10/1998 | Odell ............... B64C 1/1415 244/129.5 |
| 5,931,415 | A * | 8/1999 | Lingard ............... B64C 1/143 244/129.4 |
| 5,984,382 | A | 11/1999 | Bourne et al. |
| 6,123,370 | A | 9/2000 | Rozema et al. |
| 6,343,815 | B1 | 2/2002 | Poe |
| 6,361,090 | B1 | 3/2002 | Fan |
| 6,629,712 | B2 * | 10/2003 | Jackson ............... B64D 29/02 244/129.4 |
| 6,755,448 | B2 * | 6/2004 | Jackson ............... B64D 29/06 244/110 B |
| 6,913,297 | B2 | 7/2005 | Jackson et al. |
| 7,029,038 | B2 | 4/2006 | Kobrehel |
| 7,156,429 | B2 | 1/2007 | Eriksson |
| 7,504,601 | B2 | 3/2009 | Belmond et al. |
| 7,857,362 | B2 | 12/2010 | Deblock |
| 8,047,583 | B2 * | 11/2011 | Clausen ............... B64C 1/1407 244/129.1 |
| 8,439,308 | B2 * | 5/2013 | Armstrong ............... B64C 7/02 244/129.4 |
| 8,479,543 | B2 | 7/2013 | Yang et al. |
| 8,646,819 | B2 | 2/2014 | Do et al. |
| 8,727,390 | B2 | 5/2014 | Do |
| 8,864,185 | B2 | 10/2014 | Do |
| 9,353,559 | B2 | 5/2016 | Fabre et al. |
| 2002/0000493 | A1 * | 1/2002 | Erben ............... B64C 1/1407 244/129.5 |
| 2002/0000726 | A1 | 1/2002 | Zintler |
| 2002/0060459 | A1 | 5/2002 | Zintler |
| 2005/0087996 | A1 | 4/2005 | Jackson et al. |
| 2006/0010769 | A1 * | 1/2006 | Pelz ............... B64C 1/1407 49/141 |
| 2006/0214431 | A1 | 9/2006 | Helsley et al. |
| 2008/0129056 | A1 | 6/2008 | Hernandez et al. |
| 2008/0277530 | A1 * | 11/2008 | Kyle ............... B64C 1/1407 244/129.5 |
| 2010/0096503 | A1 * | 4/2010 | Tanner ............... B64D 13/02 244/129.4 |
| 2011/0109103 | A1 | 5/2011 | Huston et al. |
| 2012/0102842 | A1 | 5/2012 | Fournie et al. |
| 2012/0151724 | A1 | 6/2012 | DeFrance et al. |
| 2015/0184543 | A1 | 7/2015 | Fabre et al. |
| 2015/0184544 | A1 | 7/2015 | Fabre et al. |
| 2015/0375845 | A1 * | 12/2015 | Salgues ............... B64C 1/1407 244/129.5 |
| 2015/0375866 | A1 * | 12/2015 | Salgues ............... B64D 13/04 244/129.5 |
| 2017/0089124 | A1 * | 3/2017 | Do ............... B64C 1/1461 |
| 2017/0129585 | A1 * | 5/2017 | Erben ............... B64C 1/143 |
| 2018/0222567 | A1 * | 8/2018 | Lopez Fern Ndez ............... B64C 1/1407 |

FOREIGN PATENT DOCUMENTS

| | | |
|---|---|---|
| DE | 29807738 U1 | 7/1998 |
| EP | 0 876 954 A2 | 11/1998 |
| EP | 1091059 A2 | 4/2001 |
| EP | 2031157 A1 | 3/2009 |
| EP | 2 586 707 A1 | 5/2013 |
| FR | 2397503 A1 | 2/1979 |
| FR | 2852049 A1 | 9/2004 |
| GB | 191493 A | 1/1923 |
| GB | 1497982 A | 1/1978 |
| GB | 1537410 A | 12/1978 |
| WO | 2009/051875 A2 | 4/2009 |
| WO | 2010033026 A1 | 3/2010 |
| WO | 2010149905 A1 | 12/2010 |
| WO | 2014/062971 A1 | 4/2014 |

OTHER PUBLICATIONS

Fairchild Fasteners, Aerospace Mechanisms, "RAM™ Aerospace Latch Mechanism", 2000 (4 pages).
Rotary Latch #TL18261, Alcoa Fastening Systems, Mar. 2005 (1 page).
English-language translation of WO 2010/149905 A1 (8 pages).
International Search Report and Written Opinion dated Jul. 20, 2012, issued by the European Patent Office in connection with International Patent Application No. PCT/US2012/028418 entitled "Pin Latch Having Intermediate Position" (13 pages).
International Search Report and Written Opinion dated Jan. 18, 2013, issued by the European Patent Office in connection with International Patent Application No. PCT/US2012/059206 entitled "Rotary-Handle Latch" (9 pages).
International Search Report and Written Opinion dated Feb. 25, 2013, issued by the European Patent Office in connection with International Patent Application No. PCT/US2012/066039 entitled "Pin Latch With Detection Device and Movable Catch-Pin and Intermediate Position With Automatic Return Mechanism" (15 pages).
International Search Report and Written Opinion dated Dec. 29, 2011, issued by the European Patent Office in connection with International Patent Application No. PCT/US2011/027871 entitled "Latch With Adjustable Handle" (17 pages).
International Search Report and Written Opinion dated Jul. 15, 2011, issued by the European Patent Office in connection with International Patent Application No. PCT/US2011/027671 entitled "Latch With Adjustable Handle" (8 pages).

(56) References Cited

OTHER PUBLICATIONS

International Search Report and Written Opinion dated Jun. 7, 2011, issued by the European Patent Office in connection with International Patent Application No. PCT/US2011/024031 entitled "Side-Driven Action Pin Latch" (9 pages).
International Search Report and Written Opinion dated Jun. 9, 2016, issued by the European Patent Office in connection with International Patent Application No. PCT/US2016/024836 (13 pages).
Alcoa Fastening Systems, Document TL22028 Rev. P, dated Jun. 18, 2015 (2 pages).
Alcoa Fastening Systems, Document TL18356 Rev. D, dated Jul. 7, 2015 (2 pages).
International Search Report and Written Opinion dated Jan. 23, 2017, issued by the European Patent Office in International (PCT) Patent Application No. PCT/US2016/054090.

\* cited by examiner

PRESSURE RELIEF DOOR

CROSS-REFERENCE TO RELATED APPLICATION

This application is a § 111(a) application that relates to and claims the benefit of commonly-owned, U.S. Provisional Patent Application Ser. No. 62/234,759, filed Sep. 30, 2015, entitled "PRESSURE RELIEF DOOR WITH AUTOMATIC LOCK MECHANISM," the entirety of which is incorporated herein by reference.

FIELD OF THE INVENTION

The present invention relates to pressure relief doors and, more particularly, to pressure relief doors having automatic lock mechanisms.

SUMMARY OF THE INVENTION

In an embodiment, a pressure relief door including a panel having an exterior side, an interior side opposite the exterior side, a front edge, a rear edge opposite the front edge, and a pair of side edges, each of which extends from the front edge to the rear edge; a pair of first mounting brackets mounted to the interior side of the panel, one of the first mounting brackets being mounted proximate to one of the side edges of the panel, and the other of the first mounting brackets being mounted proximate to the other of the side edges of the panel; a pair of pressure relief latches, each of which is mounted to a corresponding one of the first mounting brackets; and a pair of hinges, each of which includes a first end and a second end opposite the first end, the first end of each of the hinges being mounted to a corresponding one of the first mounting brackets proximate to the rear edge of the panel, each of the hinges further including a lock mechanism mounted to the second end of the hinge, each of the lock mechanisms including a second mounting bracket.

In an embodiment, the second mounting brackets of the lock mechanisms are linked to one another by a tube having a first end and a second opposite the first end of the tube, the first end of the tube being attached to one of the second mounting brackets, and the second end of the tube being attached to the other of the second mounting brackets. In an embodiment, each of the second mounting brackets of the lock mechanisms includes a boss and a stop, the tube being adapted to pivot about the bosses. In an embodiment, the tube includes a pair of pins positioned therein and a pair of compression springs positioned therein, each of the pins including a first end and second end opposite the first end of the pin, each of the first ends of each of the pins being positioned against an inner surface of a corresponding one of the hinges, and each of the second ends of each of the pins being positioned against and loaded by a corresponding one of the compression springs. In an embodiment, the tube includes a pair of thumbs, a pair of diametrically opposed first slots located at the first end of the tube, and a pair of diametrically opposed second slots located at the second end of the tube, one of the thumbs being attached to one of the pins and extending through the first slots, and the other of the thumbs being attached to the other of the pins and extending through the second slots.

In an embodiment, the pressure relief door is moveable from a closed position to an open position, and from the open position to the closed position. In an embodiment, the pressure relief door is adapted to be installed within a structure, wherein when the pressure relief door is in its closed position, the exterior side of the panel is substantially flush with an exterior surface of the structure, the lock mechanisms are engaged with an interior surface of the structure, and the pressure relief latches are engaged with the interior surface of the structure. In an embodiment, when the pressure relief door is moved from its closed position to its open position, the pressure relief latches are disengaged with the interior surface of the structure, while the lock mechanisms remain engaged with the interior surface of the structure.

In an embodiment, each of the hinges includes a tubular portion having a hole formed axially therein. In an embodiment, when the pressure relief door is moved to its open position, the hinges pivot in a first direction and are stopped by the stops of the second mounting brackets, and the holes of the tubular portions of the hinges align with the tubing, the compression springs expand and push the corresponding pins through the corresponding holes of the hinges, and each of the corresponding thumbs stop at first ends of each of the corresponding pairs of the first and second slots of the tube to retain the pins engaged and locked with the corresponding one of the hinges. In an embodiment, the thumbs are adapted to be moved axially with respect to the tube and toward one another until the thumbs stop at second ends of the corresponding pair of first and second slots, thereby enabling the pins to disengage and clear the corresponding holes of the tubular portions of the hinges, and further enabling the hinges to pivot in a second direction opposite the first direction and away from the pins so as to enable to move the pressure relief door from its open position to its closed position.

In an embodiment, a pressure relief door includes a panel having an exterior side, an interior side opposite the exterior side, a front edge, a rear edge opposite the front edge, and a pair of side edges, each of which extends from the front edge to the rear edge; a pair of pressure relief latches mounted to the interior side of the panel, one of the pressure relief latches being mounted proximate to one of the side edges of the panel, and the other of the pressure relief latches being mounted proximate to the other of the side edges of the panel; and a pair of hinges, each of which includes a first end and a second end opposite the first end, the first end of each of the hinges being mounted to the panel, each of the hinges further including a lock mechanism mounted to the second end of the hinge, each of the lock mechanisms including a mounting bracket.

In an embodiment, the lock mechanisms ensure that the door panel is retained and locked when opened by a high pressure build-up inside a compartment and to prevent damage to a structure. In an embodiment, the pressure relief door is adapted for use in the aerospace field, such as aerospace doors, nacelles, etc. In other embodiments, the pressure relief door can be used in other fields and applications.

DETAILED DESCRIPTION OF THE DRAWINGS

Figure 1:
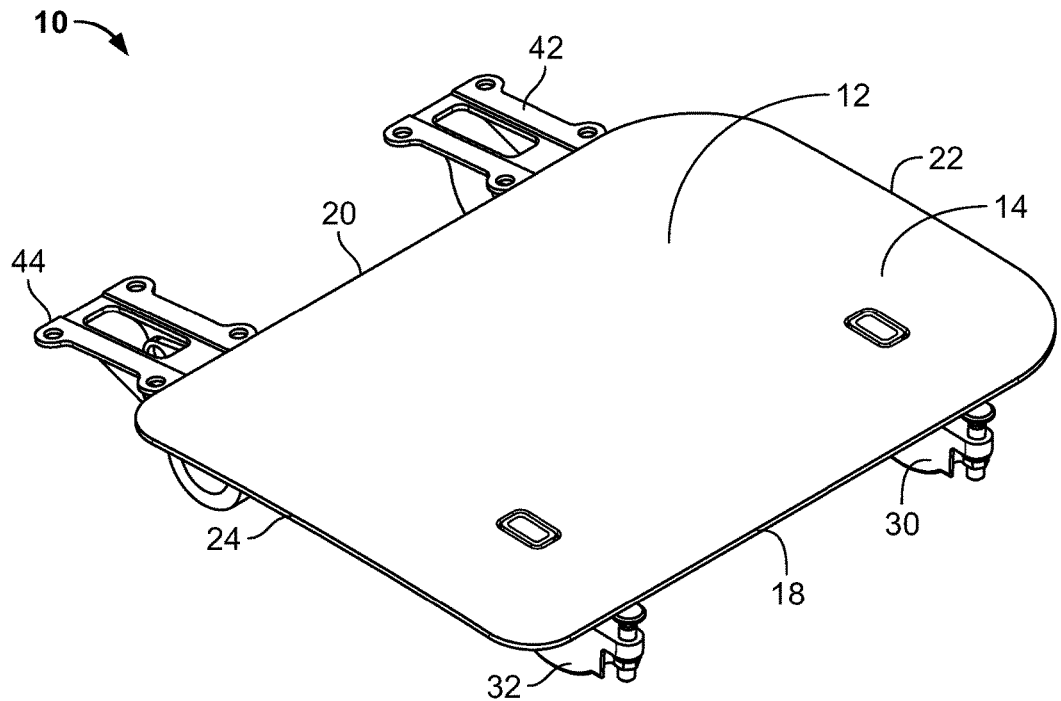
FIG. 1 is a top perspective view of a pressure relief door in accordance with an embodiment.
Figure 2:
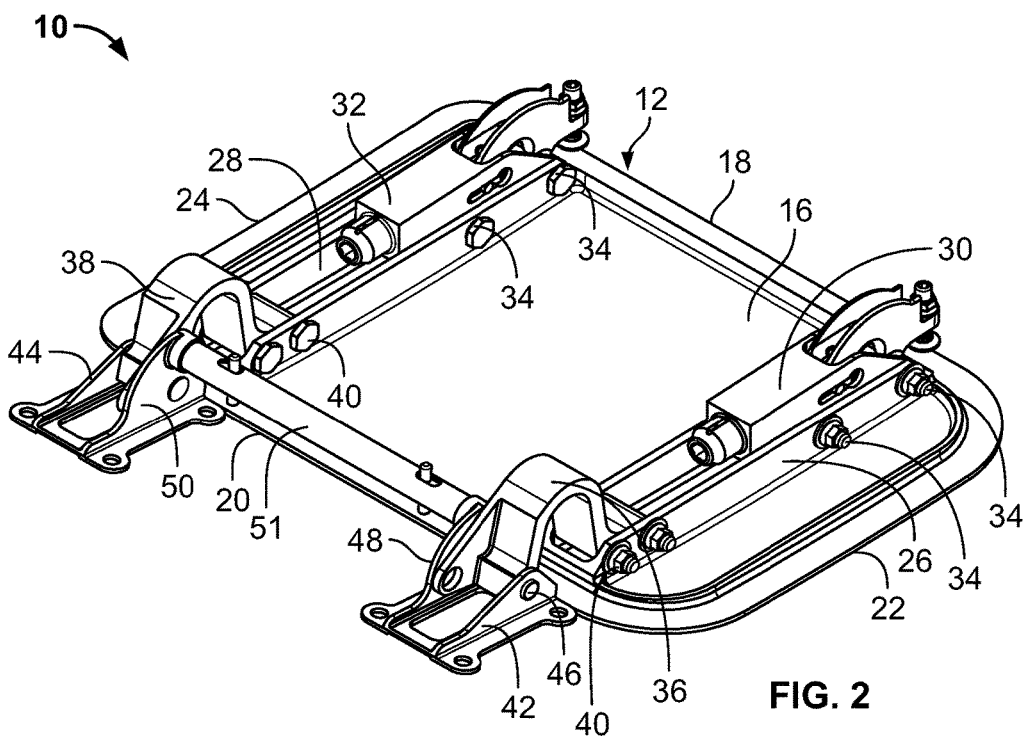
FIG. 2 is a bottom perspective view of the pressure relief door shown in FIG. 1.

Referring to FIGS. 1 and 2, in an embodiment, a pressure relief door 10 includes a door panel 12 having a first, exterior side 14 and a second, interior side 16 opposite the first side 14, a front edge 18, a rear edge 20 opposite the front edge 18, and a pair of side edges 22, 24, each of which extends from the front edge 18 and to the rear edge 20. In an embodiment, a pair of spaced-apart, first mounting brackets 26, 28 is mounted on the second, interior side 16 of the door panel 12. In an embodiment, the mounting bracket 26 is mounted proximate to the side edge 22, and the mounting bracket 28 is mounted proximate to the side edge 24. In an embodiment, a pressure relief latch 30 is mounted to the mounting bracket 26 proximate to the front edge 18, while a pressure relief latch 32 is mounted to the mounting bracket 28 proximate to the front edge 18. The pressure relief latches 30, 32 are mounted to the corresponding mounting brackets 26, 28 by fasteners 34. In an embodiment, the pressure relief latches 30, 32 are identical in structure and function to one another.

Figure 3:
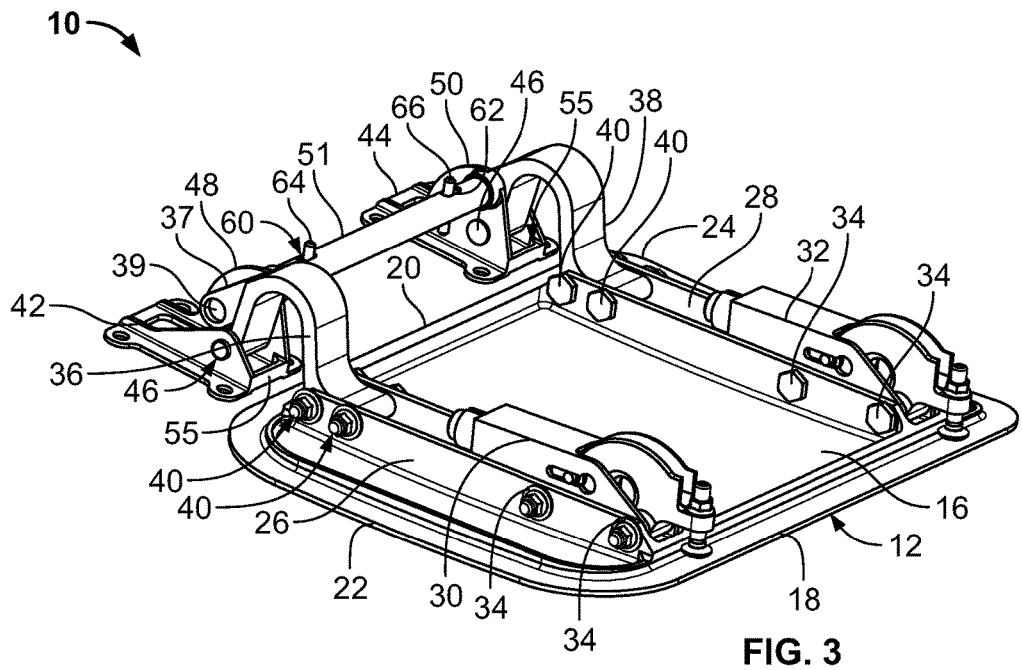
FIG. 3 is another bottom perspective view of the pressure relief door shown in FIG. 2, the door being shown in a closed position.

Referring to FIGS. 1 through 3, in an embodiment, one end of a hinge 36 is mounted to the mounting bracket 26 proximate to the rear edge 20, while one end of a hinge 38 is mounted to the mounting bracket 28 proximate to the rear edge 20. In an embodiment, each of the hinges 36, 38 includes a tubular portion 37 having an axial hole 39 formed therein (see FIG. 3). The hinges 36, 38 are mounted to the corresponding mounting brackets 26, 28 by fasteners 40. In an embodiment, the hinges 36, 38 are substantially U-shaped. In an embodiment, the hinges 36, 38 are identical in structure and function to one another. In an embodiment, a lock mechanism 42 is mounted to an opposite end of the hinge 36 by a rivet 46, while a lock mechanism 44 is mounted to an opposite end of the hinge 38 by a rivet 46. In an embodiment, each of the lock mechanisms 42, 44 include a second mounting bracket 48, 50, respectively. Each of the second mounting brackets 48, 50 includes a boss 41 (see FIG. 5) and a stop 55 (see FIG. 3). In an embodiment, the second mounting brackets 48, 50 of the lock mechanisms 42, 44 are linked to one another by a tube 51. In an embodiment, the tube 51 is adapted to pivot about the bosses 41 of the second mounting brackets 48, 50.

Figure 5:
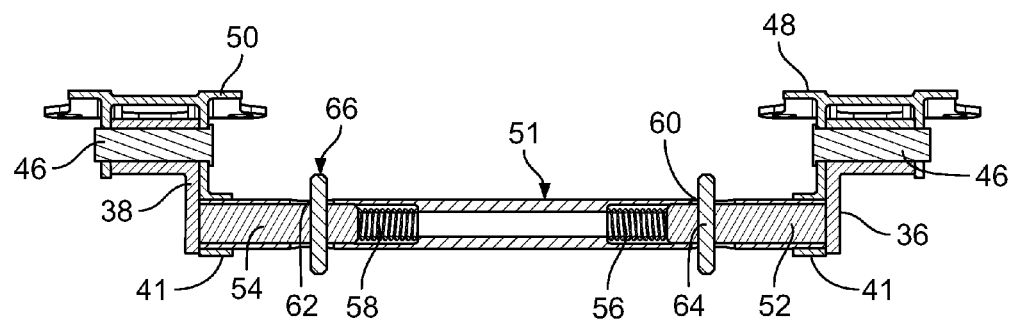
FIG. 5 is a side cross-sectional view, taken along section lines 5-5 and looking in the direction of the arrows, of a lock mechanism employed by the pressure relief door shown in FIG. 4.

Referring to FIG. 5, cylindrical-shaped pins 52, 54 are nested in the tube 51. In an embodiment, one end of the pin 52 is positioned against an inner surface of the hinge 36, while an opposite end of the pin 52 is positioned against and loaded by a compression spring 56, which is also nested within the tube 51 and aligned axially with the pin 52. Similarly, one end of the pin 54 is positioned against an inner surface of the hinge 38, while an opposite end of the pin 54 is positioned against and loaded by a compression spring 58, which is also nested within the tube 51 and aligned axially with the pin 54. In an embodiment, the tube 51 includes first and second pairs of diametrically opposed, elongated slots 60, 62, each of which extends perpendicularly through opposite sides of the tube 51. In an embodiment, a thumb 64 is attached to the pin 52 and extends through the elongated slots 60, while a thumb 66 is attached to the pin 54 and extends through the elongated slots 62.

Figure 4:
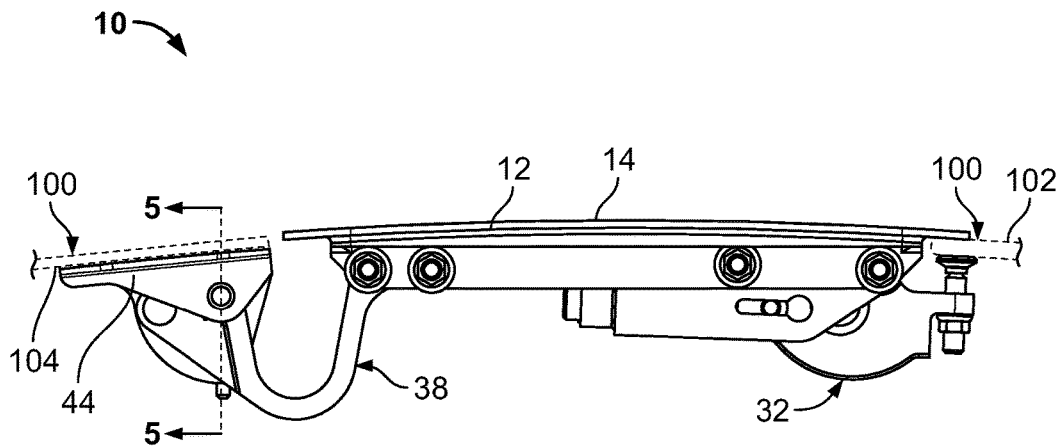
FIG. 4 is a side elevational view of the pressure relief door shown in FIG. 3 and installed within a structure, which is shown in phantom.

FIG. 4 illustrates the pressure relief door 10 installed within a structure 100, with the pressure relief door 10 in a closed position. In an embodiment, the first, exterior side 14 of the door panel 12 is flush or substantially flush with an exterior surface 102 of the structure 100 when the pressure relief door 10 is in its closed position, while the lock mechanisms 42, 44 (only of which being shown in FIG. 4) are positioned and locked against an interior surface 104 of the structure when the pressure relief door 10 is in its closed position. Moreover, the pressure relief latches 30, 32 (only one of which being shown in FIG. 4) are engaged with the interior surface 104 of the structure 100.

Figure 6:
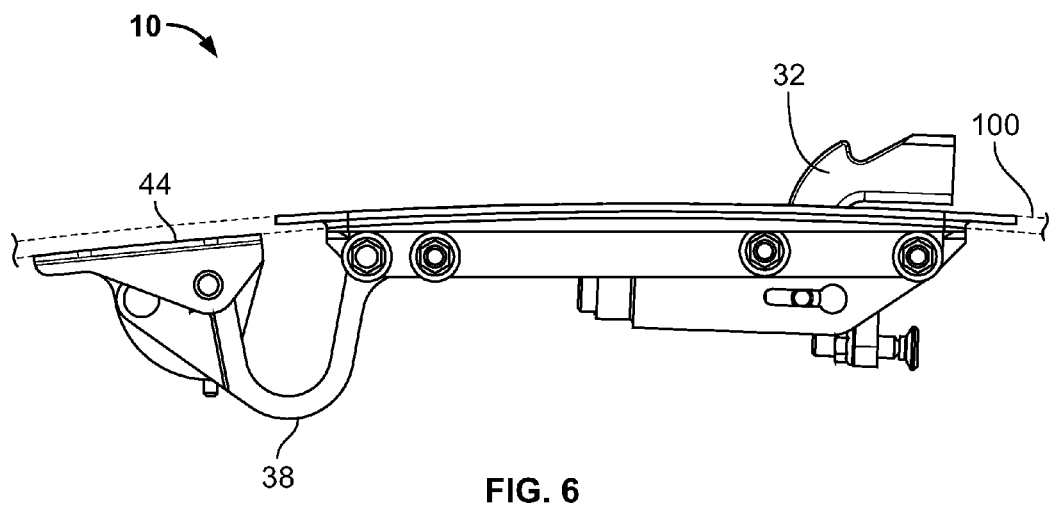
FIG. 6 is a side elevational view of the pressure relief door shown in FIG. 4, with pressure relief latches employed by the door shown disengaged from the structure.
Figure 7:
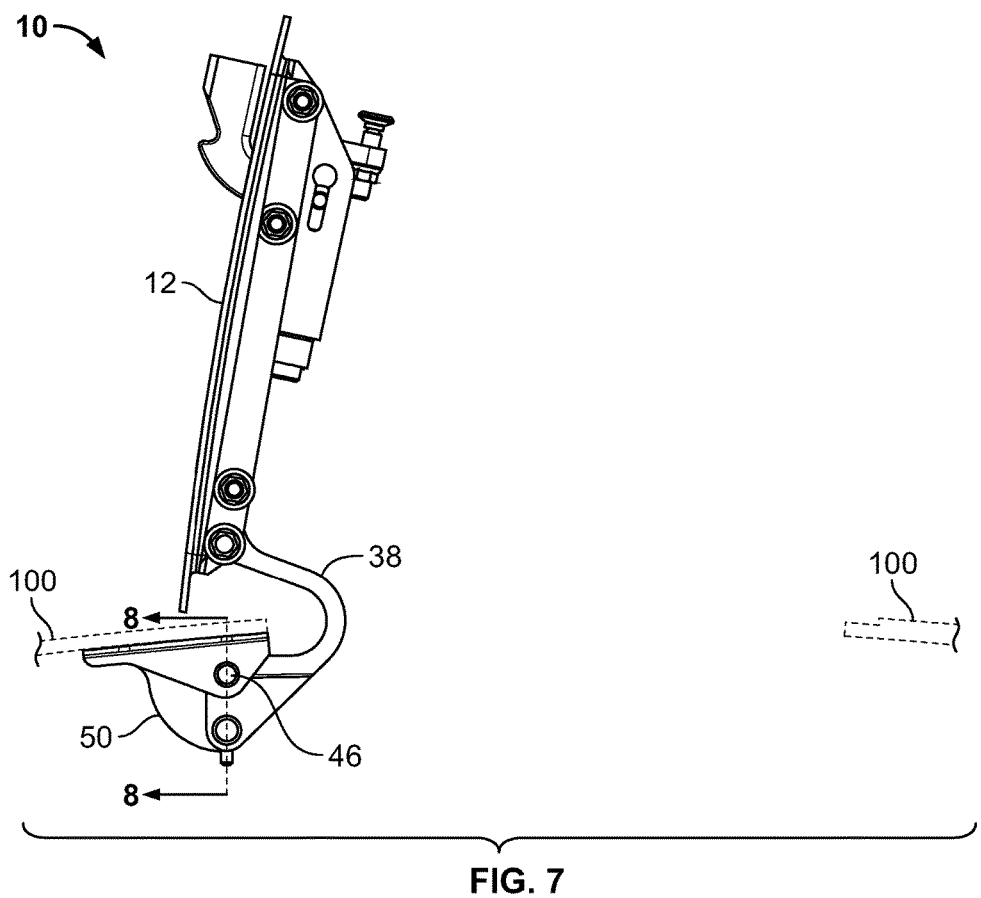
FIG. 7 is a side elevational view of the pressure relief door shown in FIG. 6, with the door being shown in an open position.
Figure 8:
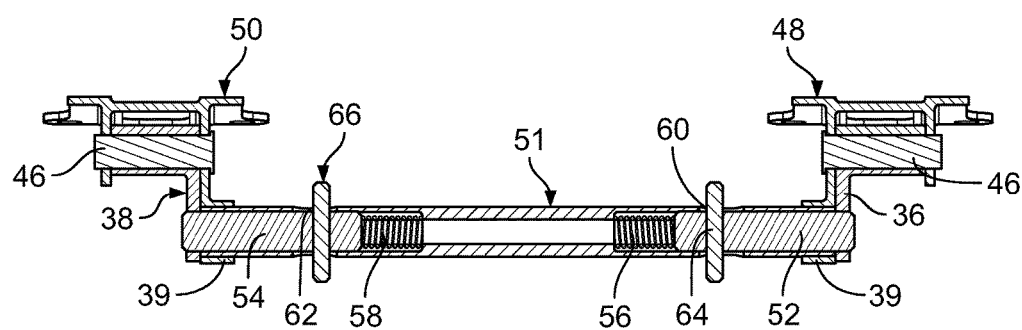
FIG. 8 is side cross-sectional view, taken along section lines 8-8 and looking in the direction of the arrows, of the lock mechanism of the pressure relief door shown in FIG. 7.

Referring to FIG. 6, from a closed position of the pressure relief door 10, the pressure relief latches 30, 32 (only one of which being shown in FIG. 6) disengage the structure 100 under a high pressure, while lock mechanisms 42, 44 (only one of which being shown in FIG. 6) remain engaged with the structure 100. Referring to FIG. 7, the pressure relief door 10, and specifically, the door panel 12, swings open. In this regard, the hinges 36, 38 pivot about the rivets 46 and rotate towards the open position until they are stopped by the stops 55 of the second mounting brackets 48, 50, and the holes 39 in the hinges 36, 38 align with the tube 51. Referring to FIG. 8, the compression springs 56, 58 then automatically expand and push the corresponding pins 52, 54 through the holes 39 in the hinges 36, 38, and the thumbs 64, 66 stop at ends of the corresponding slots 60, 62 to retain the pins 52, 54 engaged and locked with the corresponding hinge 36, 38.

From the open position, the pressure relief door 10 may be closed manually by squeezing the thumbs 64, 66 axially with respect to the tube 51 and toward each other, and the pressure relief door 10, specifically the door panel 12, is rotated towards the closed position. In this regard, the pins 52, 54 compress the corresponding compression springs 56, 58 until the thumbs 64, 66 stop at the opposite ends of the corresponding slots 60, 62. At this point, the pins 52, 54 completely disengage and clear the holes 39 of the hinges 36, 38 to enable the hinges 36, 38 to rotate towards the closed position and away from the pins 52, 54. The pins 52, 54 are loaded by the corresponding compression springs 56, 58, which, in turn, contact the surfaces of the hinges 36, 38 and the door panel 12 is maintained in a closed position, as shown in FIG. 4. The pressure relief latches 30, 32 are then engaged with the interior surface 104 of the structure 100, as shown in FIG. 4.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:
1. A pressure relief door, comprising:
 a panel having an exterior side, an interior side opposite the exterior side, a front edge, a rear edge opposite the front edge, and a pair of side edges, each of which extends from the front edge to the rear edge;

a pair of first mounting brackets mounted to the interior side of the panel, one of the first mounting brackets being mounted proximate to one of the side edges of the panel, and the other of the first mounting brackets being mounted proximate to the other of the side edges of the panel;

a pair of pressure relief latches, each of which is mounted to a corresponding one of the first mounting brackets; and a pair of hinges, each of which includes a first end and a second end opposite the first end, the first end of each of the hinges being mounted to a corresponding one of the first mounting brackets proximate to the rear edge of the panel, each of the hinges further including a lock mechanism mounted to the second end of the hinge, each of the lock mechanisms including a second mounting bracket, the second mounting brackets of the lock mechanisms being linked to one another by a tube having a first end and a second opposite the first end of the tube, the first end of the tube being attached to one of the second mounting brackets, and the second end of the tube being attached to the other of the second mounting brackets, each of the second mounting brackets of the lock mechanisms including a boss and a stop, the tube being adapted to pivot about the bosses, the tube including a pair of pins positioned therein and a pair of compression springs positioned therein, each of the pins including a first end and second end opposite the first end of the pin, each of the first ends of each of the pins being positioned against an inner surface of a corresponding one of the hinges, and each of the second ends of each of the pins being positioned against and loaded by a corresponding one of the compression springs.

2. The pressure relief door of claim 1, wherein the tube includes a pair of thumbs, a pair of diametrically opposed first slots located at the first end of the tube, and a pair of diametrically opposed second slots located at the second end of the tube, one of the thumbs being attached to one of the pins and extending through the first slots, and the other of the thumbs being attached to the other of the pins and extending through the second slots.

3. The pressure relief door of claim 2, wherein the pressure relief door is moveable from a closed position to an open position, and from the open position to the closed position.

4. The pressure relief door of claim 3, wherein the pressure relief door is adapted to be installed within a structure, wherein when the pressure relief door is in its closed position, the exterior side of the panel is substantially flush with an exterior surface of the structure, the lock mechanisms are engaged with an interior surface of the structure, and the pressure relief latches are engaged with the interior surface of the structure.

5. The pressure relief door of claim 4, wherein when the pressure relief door is moved from its closed position to its open position, the pressure relief latches are disengaged with the interior surface of the structure, while the lock mechanisms remain engaged with the interior surface of the structure.

6. The pressure relief door of claim 4, wherein each of the hinges includes a tubular portion having a hole formed axially therein.

7. The pressure relief door of claim 6, wherein when the pressure relief door is moved to its open position, the hinges pivot in a first direction and are stopped by the stops of the second mounting brackets, and the holes of the tubular portions of the hinges align with the tubing, the compression springs expand and push the corresponding pins through the corresponding holes of the hinges, and each of the corresponding thumbs stop at first ends of each of the corresponding pairs of the first and second slots of the tube to retain the pins engaged and locked with the corresponding one of the hinges.

8. The pressure relief door of claim 7, wherein the thumbs are adapted to be moved axially with respect to the tube and toward one another until the thumbs stop at second ends of the corresponding pair of first and second slots, thereby enabling the pins to disengage and clear the corresponding holes of the tubular portions of the hinges, and further enabling the hinges to pivot in a second direction opposite the first direction and away from the pins so as to enable to move the pressure relief door from its open position to its closed position.

9. A pressure relief door, comprising:

a panel having an exterior side, an interior side opposite the exterior side, a front edge, a rear edge opposite the front edge, and a pair of side edges, each of which extends from the front edge to the rear edge;

a pair of pressure relief latches mounted to the interior side of the panel, one of the pressure relief latches being mounted proximate to one of the side edges of the panel, and the other of the pressure relief latches being mounted proximate to the other of the side edges of the panel; and a pair of hinges, each of which includes a first end and a second end opposite the first end, the first end of each of the hinges being mounted to the panel, each of the hinges further including a lock mechanism mounted to the second end of the hinge, each of the lock mechanisms including a mounting bracket, the mounting brackets of the lock mechanisms being linked to one another by a tube having a first end and a second opposite the first end of the tube, the first end of the tube being attached to one of the mounting brackets, and the second end of the tube being attached to the other of the mounting brackets, each of the mounting brackets of the lock mechanisms including a boss and a stop, the tube being adapted to pivot about the bosses, the tube including a pair of pins positioned therein and a pair of compression springs positioned therein, each of the pins including a first end and second end opposite the first end of the pin, each of the first ends of each of the pins being positioned against an inner surface of a corresponding one of the hinges, and each of the second ends of each of the pins being positioned against and loaded by a corresponding one of the compression springs.

10. The pressure relief door of claim 9, wherein the tube includes a pair of thumbs, a pair of diametrically opposed first slots located at the first end of the tube, and a pair of diametrically opposed second slots located at the second end of the tube, one of the thumbs being attached to one of the pins and extending through the first slots, and the other of the thumbs being attached to the other of the pins and extending through the second slots.

11. The pressure relief door of claim 10, wherein the pressure relief door is moveable from a closed position to an open position, and from the open position to the closed position.

12. The pressure relief door of claim 11, wherein the pressure relief door is adapted to be installed within a structure, wherein when the pressure relief door is in its closed position, the exterior side of the panel is substantially flush with an exterior surface of the structure, the lock mechanisms are engaged with an interior surface of the structure, and the pressure relief latches are engaged with the interior surface of the structure.

13. The pressure relief door of claim 12, wherein when the pressure relief door is moved from its closed position to its open position, the pressure relief latches are disengaged with the interior surface of the structure, while the lock mechanisms remain engaged with the interior surface of the structure.

14. The pressure relief door of claim 12, wherein each of the hinges includes a tubular portion having a hole formed axially therein.

15. The pressure relief door of claim 14, wherein when the pressure relief door is moved to its open position, the hinges pivot in a first direction and are stopped by the stops of the mounting brackets, and the holes of the tubular portions of the hinges align with the tubing, the compression springs expand and push the corresponding pins through the corresponding holes of the hinges, and each of the corresponding thumbs stop at first ends of each of the corresponding pairs of the first and second slots of the tube to retain the pins engaged and locked with the corresponding one of the hinges.

16. The pressure relief door of claim 15, wherein the thumbs are adapted to be moved axially with respect to the tube and toward one another until the thumbs stop at second ends of the corresponding pair of first and second slots, thereby enabling the pins to disengage and clear the corresponding holes of the tubular portions of the hinges, and further enabling the hinges to pivot in a second direction opposite the first direction and away from the pins so as to enable to move the pressure relief door from its open position to its closed position.

* * * * *